Sept. 25, 1928. Re. 17,087

P. L. BILLINGSLEY

SAWING DEVICE

Original Filed July 5, 1921 2 Sheets-Sheet 1

Inventor

PERCY LEON BILLINGSLEY,

By Murray and Fugelter

Attorneys

Sept. 25, 1928.
Re. 17,087
P. L. BILLINGSLEY
SAWING DEVICE
Original Filed July 5, 1921 2 Sheets-Sheet 2
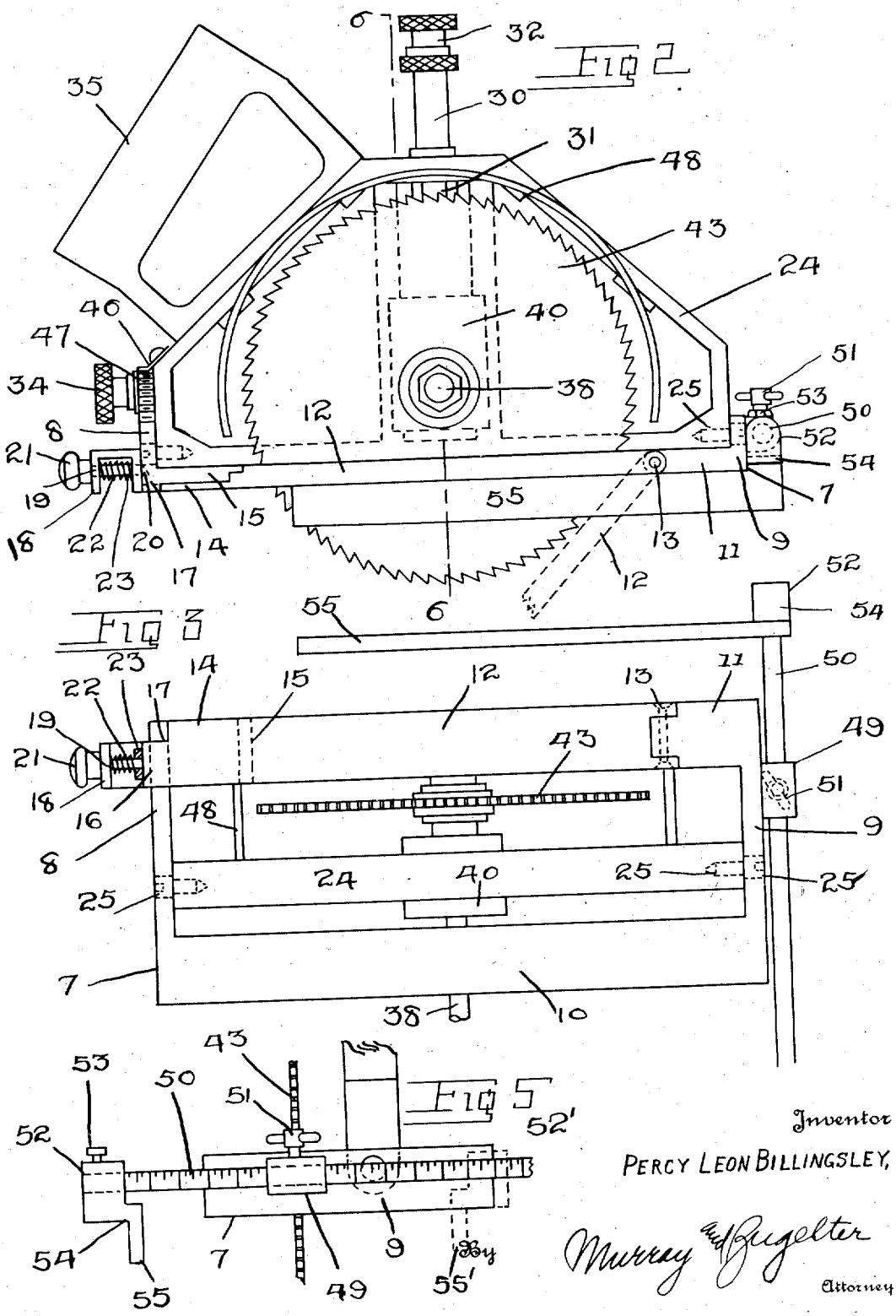
Inventor
PERCY LEON BILLINGSLEY,
By Murray and Engelter
Attorneys Reissued Sept. 25, 1928. Re. 17,087

UNITED STATES PATENT OFFICE.

PERCY LEON BILLINGSLEY, OF ORLANDO, FLORIDA, ASSIGNOR TO THE P. L. BILLINGSLEY COMPANY, OF CINCINNATI, OHIO, A CORPORATION OF OHIO.

SAWING DEVICE.

Original No. 1,529,294, dated March 10, 1925, Serial No. 482,380, filed July 5, 1921. Application for reissue filed December 28, 1926. Serial No. 157,600.

The present invention relates to sawing machines and devices, and aims to provide a novel and improved portable sawing device adapted to be driven by a flexible operating mechanism, and adapted especially for use as an attachment to the flexible operating mechanism disclosed in my copending application filed May 17, 1921, Serial No. 470,413 (Patent No. 1,424,148 granted Aug. 1, 1922).

Another object of the invention is the provision of such a device comprising novel means for mounting a circular or disk saw in order that the cut made can be regulated, including means for regulating the depth of the cut, means for regulating the angle of the cut for either a square or miter cut, and means for making the cut parallel with an edge of the board or object at a predetermined distance therefrom.

A further object is the provision of a novel detachable connection between the device and driving or operating mechanism for the convenient and efficient assemblage and separation thereof, and enabling other devices or attachments to be used interchangeably with the sawing device, using the same driving mechanism for all.

A still further object is the provision of such a device which is useful for sawing wood, either across, with or at an angle to the grain, with a square or miter cut, in order to supply the requirements for which ordinary hand saws are used, and the device having novel and improved features of construction to enhance the utility and efficiency thereof for the intended purposes.

The invention has for another object to provide a power-driven saw mounted and carried by a device which can be conveniently manipulated manually for doing various kinds of sawing with ease and dispatch, and the device including adjustments to regulate the cuts made in order to comply with various conditions required.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:—

Fig. 2 is a side elevation from the opposite direction, showing the gate bar swung open in dotted lines and partly broken away.

Fig. 3 is a bottom plan view of the device, with the driving mechanism removed.

Fig. 5 is a fragmentary end view looking from the opposite direction.

Figure 1:
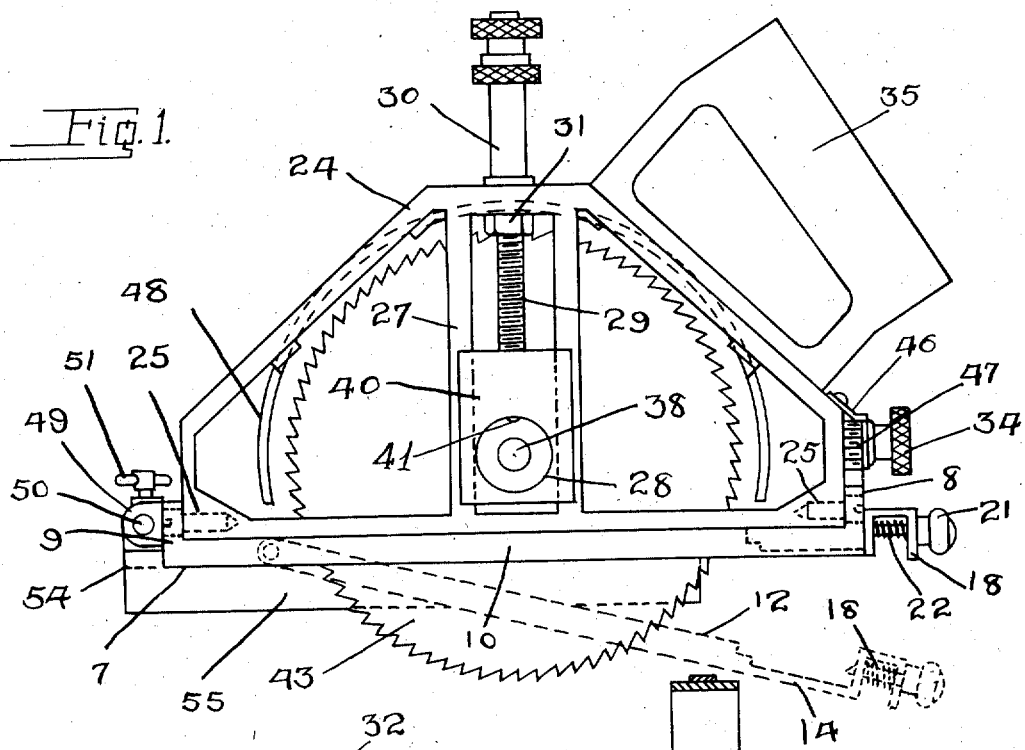
Fig. 1 is a side elevation of the device, with the driving mechanism removed, and showing the gate bar in a partly open position in dotted lines.

The device comprises a base or slide 7 to slide on the surface of the board or other object worked on, and including the opposite ends 8 and 9 connected by an integral longitudinal side bar 10. The end 9 has a stub 11 projecting therefrom toward the end 8 at the side opposite to the bar 10, and a gate bar 12 is hinged, as at 13, to the stub 11 to swing downwardly and upwardly. The bar 12 is provided at its free end with a thinned portion 14 to fit snugly under a stub 15 projecting from the end 8 of the base toward the stub 11, said portion 14 and stub 15 overlapping with a scarf joint. When the bar 12 is swung down, as indicated in dotted lines in Fig. 2, this leaves a clearance or gate opening between the stubs 11 and 15, and means is provided for fastening the bar 12 to the end 8, whereby said bar 12 assists in supporting and guiding the base, and also rigidly connects the ends 8 and 9 at that side opposite to the bar 10. Thus, the portion 14 has an extension 16 to enter a notch 17 in the lower edge of the end 8, thereby steadying the bar 12 against transverse displacement, and the extension 16 has an inverted U-shaped latch support 18 in which a latch bolt 19 is slidable longitudinally of the bar 12. The inner end of the latch bolt is bevelled to snap into a keeper notch 20 in the end 8, when the bar 12 is swung to closed position. The latch bolt 19 has a knob 21 on its outer end, for retracting the latch bolt by hand, and a coiled expansion spring 22 is disposed on the latch bolt within the support 18 and is confined between said support and a pin 23 or other element secured to the latch bolt, whereby to project the latch bolt into the notch 20. This latch bolt will therefore hold the bar 12 in its closed position, so that the bars 10 and 12 will provide shoes or runners to slide on the surface of the wood.

A miter frame or member 24 is provided for regulating the angle of the cut made, and its lower portion is disposed longitudinally between the longitudinal bars or runners 10 and 12 of the base, and said member 24 extends upwardly from the base. The ends of the member 24 are pivoted to the ends of the base, and, as shown, the ends of the member 24 abut the ends 8 and 9 of base, and are pivoted thereto by means of pivot screws 25 extending inwardly through the ends 8 and 9 into the ends of the member 24, thus mounting said member for transverse swinging or tilting adjustment from one side to the other about a longitudinal axis.

The member 24 has a guide or slideway 27 perpendicular with the lower portion or axis of said member, and a depth slide or block 40 is slidable upwardly and downwardly in the guide or slot 27, and has a circular opening or bore 28 extending therethrough transversely of the base 7 and member 24. An upstanding screw stem 29 is secured in the upper portion of the slide 40 and passes slidably through the upper portion of the member 24, and an adjusting nut 30 is threaded on said stem and bears on the member 24. A lock nut 31 is threaded on the stem below the upper portion of the member 24, and a lock nut 32 can be threaded on the upper terminal of the stem to bear on the nut 30, in order that when the nut 30 is rotated to adjust the slide 40 to the desired vertical position with respect to the base 7, the nuts 31 and 32 can be tightened for retaining the adjustment.

The end 8 of the base has an arcuate slot 33 receiving a clamping screw 34 engaged in the corresponding end of the member 24, whereby the member 24 can be clamped in its various angular adjustments. In order to facilitate the adjustment of the member 24 to different angles, a pointer or index 46 is secured to said end portion of the member 24 and is movable over miter or degree graduations 47 on the end 8 of the base.

A handle 35 is secured on the member 24 near one end thereof, for conveniently sliding the device lengthwise for the sawing operation.

The circular or disk saw 43 is disposed between the bars 10 and 12 of the base at one side of the member 24, and is located between said member 24 and the gate bar 12.

Figure 6:
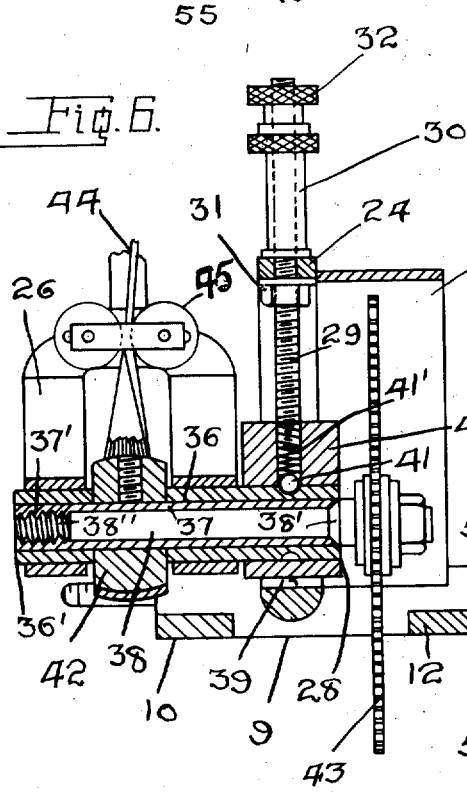
Fig. 6 is a vertical section on the line 6—6 of Fig. 2, with the driving mechanism attached.
Figure 4:
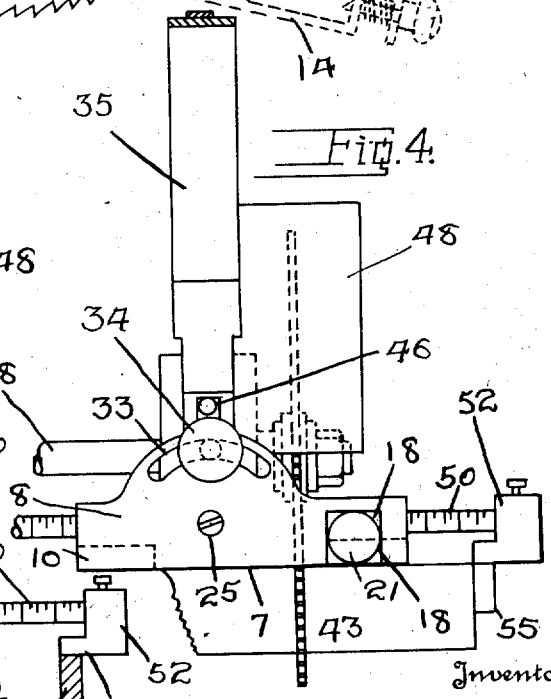
Fig. 4 is an end view.

The saw or equivalent implement is rotated by a driving or operating mechanism which is assembled with the slide 40. As shown in Fig. 6 the flexible operating mechanism, as disclosed in the aforesaid application, is used, and only the freely movable terminal portion of such mechanism is shown (the same reference characters being used as in such application). Such mechanism includes a terminal yoke 26 which has bushings 36 and 36′ secured in the terminals thereof, and a tubular spindle or arbor 37 is fitted for rotation in said bushings. A pulley wheel 42 is secured on the spindle 37 between said bushings for retaining the spindle in place, and a belt 44 passes around said pulley wheel for rotating said spindle, and is guided between rollers 45. The mandrel or shaft 38 on which the saw or implement 43 is secured, is received by the tubular spindle 37, and said spindle has a screw-threaded portion 37′ at that end opposite to the saw into which the screw threaded terminal 38″ of the mandrel or shaft 38 is screwed, for fastening said shaft to the spindle. The shaft has a collar 38′ thereon to bear against that end of the spindle opposite to the screw-threaded end, for fastening the shaft securely to the spindle, and the saw 43 is secured on said shaft adjacent to the collar 38′. The bushing 36 is extended from the yoke 26 in order to enter the opening 28 of the slide or block 40, in order to provide a detachable slip connection between the driving mechanism and the portable or movable device. The extended portion of the bushing 37 is thus conveniently slipped into the opening 28, for assembling the mechanism and device, and in order to hold them assembled, said bushing has an annular groove 39 in the extended portion thereof to receive a ball or catch 41 slidable in the slide or block 40 and projected by a spring 41′ confined behind said ball. When the slide 40 and bushing 36 are fitted together, the ball or catch 41 is pressed into the bore or socket, and when the parts are moved together, said ball will snap into the groove 39, thereby holding the yoke 26 and slide 40 together, but permitting said parts to turn relatively, when the device is moved longitudinally. The bushing 36 can thus turn in the slide 40. When the driving mechanism and device are thus assembled, the saw can be attached, by opening the gate bar 12 and sliding the saw mandrel 38 into the spindle 37 and screwing said mandrel into place. The gate bar 12 being open, permits the saw to move into the base, and said gate bar can then be closed and latched. The saw or implement is thus secured to the rotary spindle 37 of the driving mechanism, and such spindle will be adjusted with the slide 40 upwardly and downwardly and also with the member 24 when it is adjusted angularly. The terminal portion or bushing 36 of the driving mechanism is thus conveniently assembled with the device for adjustment therewith, to position the saw or implement accordingly, and in a like manner other devices or attachments can be used interchangeably with the sawing device, by having such devices each equipped with a slide or block 40 to fit on the bushing 36, and different kinds of saws and other tools can be secured to the spindle 37 for such devices. Various devices or attachments for doing different kinds of work can thus be used interchangeably with the driving mechanism.

An arched guard 48 is carried by the member 24 at one side thereof over the saw 43, to serve as a protection against objects dropping or falling against the saw.

A width gage is provided for regulating the width of the space between the cut made and the edge of the board or other object which is being cut, and, for this purpose, the end 9 of the base has a lug 49 through which a gage rod 50 is slidable transversely across said end of the frame, and said rod is graduated to indicate the adjustments made. A set screw 51 is threaded in the lug 49 to clamp the rod 50 in its various adjustments. A block 52 is secured on one end of the rod 50 by means of a set screw 53, or the like, and has an offset portion 54 extending toward the lug 49, to move under said lug when the block 52 is brought against one end of said lug. A guide bar 55 extends from the offset portion 54 toward the opposite end of the frame, and can be moved under the base. This guide bar 55 is disposed in a longitudinal plane, at right angles with the lower surface of the base, to move along the edge of the board. Said bar 55 extends across one side of the saw and the distance between said guide bar and saw is determined by the adjustment of the gage rod 50. This permits adjustment to be made for spacing the cut a predetermined distance from the edge or corner of the board or object which is being worked on. The bar 55 and attaching block 52 as shown are for use at one side of the saw, and by using a similar guide bar 55′ and attaching block 52′, with a reversed offset portion, as seen in dot and dash lines in Fig. 5, such bars can be used at the opposite side of the saw. Right and left hand guide bars can thus be used on the same gage rod 50 by fastening said guide bars to the opposite ends of said rod at the opposite sides of the saw. Either or both of the right and left hand guide bars can thus be used as needed.

In using the device, the slide or block 40 is assembled with the driving mechanism, by fitting the bushing 36 in said slide, and the ball 41 in snapping in the groove 39, will hold the mechanism and device assembled. The saw mandrel 38 is then slipped into the spindle 37, the gate bar 12 having been swung open to permit the saw to pass through into the base. Said gate bar is then closed, and the saw mandrel secured in the spindle 37 to be driven by the driving mechanism. The member 24 can then be adjusted to different angles relatively to the base 7, by loosening the clamping screw 34, and the pointer 46 will indicate the angle of said member on the graduations 47. The saw 43 can be set to make a square or right-angled cut, or it can be tilted to different laterally inclined positions, with respect to the base, for making miter or bevel cuts. After the miter adjustment is made, the slide 40 can now be adjusted upwardly or downwardly after the nuts 31 and 32 are loosened, by turning the nut 30, which will regulate the depth of the cut by adjusting the saw vertically with respect to the base. The vertical and angular adjustments are the only adjustments of the saw relatively to the base, and such adjustments maintain the saw, in any of its adjustments, in a plane parallel with the direction of movement of the slide or base 7. Therefore, in any adjustment of the saw, the saw will follow the line of movement of the base, inasmuch as it is impossible to position the saw obliquely or at an angle to the line of movement of the base. The saw guard 48 can be detached, if necessary, or replaced by another one, if the saw is raised much higher than shown in the drawings. The gage rod 50 can then be adjusted to space the guide bar 55 the desired distance from the saw, and thereby regulate the width of the space between the cut made by the saw and the edge of the board along which said bar 55 moves. The saw being rotated at a high speed by the driving mechanism, will cut the wood rapidly, so that the device can be moved by the handle 35 with a comparatively rapid motion, to make a clean and quick cut, either across, with or at an angle to the grain of the wood and with a considerable saving in time and labor. The device can thus be conveniently used for sawing boards, and other objects, and for practically all purposes for which hand saws are now employed, making the work quicker and easier.

To detach the device from the driving mechanism, the gate bar 12 is opened, and the saw mandrel unscrewed from the spindle 37, to permit the saw and mandrel to be removed, and the slide 40 and bushing 36 can then be pulled apart easily.

Having thus described the invention, what is claimed as new is:—

1. A device of the kind described comprising a base slidable in one direction on a board or other object to be operated on, two members, one of said members being adjustably mounted on the base and the other being adjustably carried by the firstnamed member, and a rotary implement carried by the lastnamed member mounted for rotation about an axis extending at right angles to the direction of movement of the slidable base, said implement extending below the base to cut the object underneath the base, one of said members being pivotally supported for adjustment to different angles transversely with reference to said direction to bring the axis of the implement to different angles with reference to the base and the object transversely of such direction so as to obtain square and miter cuts, and the other member being adjustable toward and away from the base and object to raise and lower the implement and adjust the depth of the cut made, said adjustments maintaining the implement, in any of its adjustments relatively to the base, in a plane parallel to said direction of movement and constraining the implement from being positioned at an angle to such direction of movement.

2. A device of the kind described comprising a base slidable in one direction on a board or other object to be operated on, a miter member pivotally mounted on the base for swinging adjustment transversely of such direction to different angles about a longitudinal axis, a depth slide adjustable upwardly and downwardly in said miter member toward and away from the base and object, and a rotary implement carried by said depth slide with its axis at right angles with the aforesaid axis, said implement extending below the base to cut the object underneath the base, the implement being adjustable with the miter member to obtain square and miter cuts, and the implement being adjustable with the depth slide to raise and lower the implement and adjust the depth of the cut made.

3. A device of the kind described comprising a base slidable in one direction on a board or other object to be operated on, a miter member pivotally mounted on the base for swinging adjustment transversely to different angles about a longitudinal axis and having a slot at right angles to said axis, a depth slide adjustable upwardly and downwardly in said slot, and a rotary implement having an arbor journaled through said slide at right angles with the aforesaid axis, said implement extending below the base to cut the object underneath the base, the implement being adjustable with the miter member to obtain square and miter cuts, and the implement being adjustable with the depth slide to raise and lower the implement and adjust the depth of the cut made.

4. A device of the kind described comprising a slidable base movable in one direction on an object to be operated on and having end walls, a miter member having its ends abutting and pivoted to said end walls of the base for swinging adjustment transversely to different angles about a longitudinal axis, said member having a slot between its ends at right angles with said axis, a depth slide adjustable upwardly and downwardly in said slot, and a rotary implement having an arbor journaled within said slide at right angles with the aforesaid axis.

5. A device of the class described comprising a slidable base movable in one direction on an object to be operated on and having end walls, a miter member having its ends abutting and pivoted to said end walls of the base for swinging adjustment transversely to different angles about a longitudinal axis, and a rotary implement supported by the miter member and extending in the same direction as the aforesaid axis.

6. In a portable power actuated hand saw the combination of a frame having end members, runners secured to the end members and forming the base of the frame, a revoluble cutting tool, and a second base supporting the cutting tool and pivotally secured to the end members, whereby the cutting tool may be adjusted to angular positions relative to the frame.

7. In a power actuated handsaw the combination of a base plate comprising a surface for slidably supporting the base plate upon an object to be operated on, said base plate having an opening through it whereby spaced ends are provided on said base plate, a rotary supporting spindle, a tool on the spindle, a frame supporting the spindle and its axis in a plane in substantial parallelism with the ends of the base plate, the opposed ends of said frame having pivotal mountings on the ends of the base plate, said pivotal mountings being substantially aligned and being perpendicular to the aforesaid plane in which the spindle is supported.

8. A device of the class described comprising a base slidable in one direction on a board or other object to be operated on, a rotary implement, and means mounted on the base and supporting the rotary implement with its axis at right angle to the direction of movement of the slidable base, said supporting means being adjustable for raising and lowering the implement to vary the depth of cut made and for varying the angle at which the implement operates upon the object.

9. In a portable power actuated handsaw the combination of a frame having spaced end members, a revoluble cutting tool, and a support for the revoluble cutting tool, pivotally mounted on each of the end members of the frame, whereby the cutting tool may be adjusted to angular positions relative to the frame.

10. In a portable power actuated handsaw the combination of a frame having spaced end members, a revoluble cutting tool, and a support for the revoluble cutting tool having separate pivotal mountings on each of the end members of the frame, whereby the cutting tool may be adjusted to angular positions relative to the frame.

11. In a portable power actuated hand tool the combination of a frame comprising a base slidable on and over work to be operated on, the base being provided with an opening, a second frame supported by the first frame, above the slidable base and having a pair of pivotal mountings on the first frame, said mountings being at opposite ends of the opening in the base and having aligned axes, and a revoluble cutter mounted on the second frame, projecting through the opening in the base for operation on the work and rotating in a plane in substantial parallelism with the said axes.

12. In a portable power actuated hand saw the combination of a base frame comprising end members and side members secured to the end members, a mitre saw supporting frame pivotally secured to the end members of the base frame, and a cutting tool revolubly mounted in the mitre frame, whereby the cutting tool may be adjusted angularly to the base frame.

Signed at Cincinnati, Ohio, this 17th day of December, 1926.

PERCY LEON BILLINGSLEY.